United States Patent

Miyamoto

[11] 4,005,735
[45] Feb. 1, 1977

[54] ADAPTER WITH THREAD PROTECTOR

[76] Inventor: Eddie Kakuo Miyamoto, 1815 S. Bascom Ave., Campbell, Calif. 95008

[22] Filed: Dec. 1, 1975

[21] Appl. No.: 636,846

[52] U.S. Cl. ............................... 138/96 R; 285/33; 339/42

[51] Int. Cl.² ................... B65D 59/04; F16L 57/00

[58] Field of Search ............... 138/96 R, 96 T, 103, 138/109, 110; 285/5, 6, 33, 34, 267, 318, DIG. 22, 277, 316; 339/42, 111

[56] References Cited

UNITED STATES PATENTS

| | | | |
|---|---|---|---|
| 2,730,382 | 1/1956 | De Mastri | 285/277 |
| 2,795,438 | 6/1957 | Oetiker | 285/33 |
| 2,893,438 | 7/1959 | Rickard | 138/96 R |
| 2,956,783 | 10/1960 | Landstedt | 285/34 X |
| 2,969,994 | 1/1961 | Jacobs et al. | 285/34 |
| 3,100,655 | 8/1963 | Work | 285/33 |
| 3,176,258 | 3/1965 | Coen | 339/42 |
| 3,519,975 | 7/1970 | Prow, Jr. et al. | 339/42 X |
| 3,524,160 | 8/1970 | Robinson | 339/42 X |
| 3,727,952 | 4/1973 | Richardson | 285/316 X |
| 3,888,559 | 6/1975 | Geib | 339/111 X |

*Primary Examiner*—Robert I. Smith

[57] ABSTRACT

An adapter for connecting a nozzle or similar attachment to the threaded end of a garden hose or the like has a body with an internally threaded end connectable to the hose threads and a spring loaded retractable coaxial sleeve which extends over and protectively covers the external threads at the other end of the body to which the nozzle is connectable. When the nozzle is to be connected to the adapter, the sleeve is withdrawn over the body, compressing the spring and exposing the external threads to the nozzle. When the nozzle is disconnected, the spring expands and returns the sleeve to its protective position surrounding the threads.

2 Claims, 3 Drawing Figures

ADAPTER WITH THREAD PROTECTOR

BACKGROUND OF THE INVENTION

This invention relates to adapters and more particularly to an adapter for attaching a nozzle or similar device to the end of a garden hose or the like.

In the normal use of a garden hose, the male threaded end is often exposed to damage from various causes. As the hose lays on the ground, tools may be dropped on the threads or the hose may be stepped on or run over. In the course of changing nozzles, the hose end may be dropped on a concrete driveway or sidewalk. Damage to the threads renders the hose useless for connection to nozzles and similar devices, necessitating replacement of the thread ferrule. This is time consuming and inconvenient and moreover does not remove the possibility that threads may be again damaged from the same causes.

OBJECTS AND SUMMARY OF THE INVENTION

An object of this invention is the provision of a hose adapter which automatically protects male threads from damage when the hose is not conncted to a nozzle.

A further object is the provision of a hose adapter with thread protector means that is readily manually shifted to expose the threads for engagement by a nozzle.

These and other objects of the invention are achieved with an adapter adapted to be connected to the threaded end of a hose and having nozzle engaging threads covered by an axially slidable sleeve normally spring-biased into the thread covering position and retractable against the spring to expose the threads for connection to a nozzle.

DESCRIPTION OF PREFERRED EMBODIMENT

Figure 1:
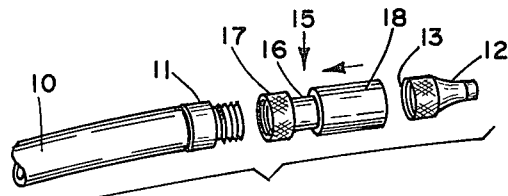
FIG. 1 is a perspective exploded view of a hose and nozzle assembly with an adapter embodying the invention.
Figure 2:
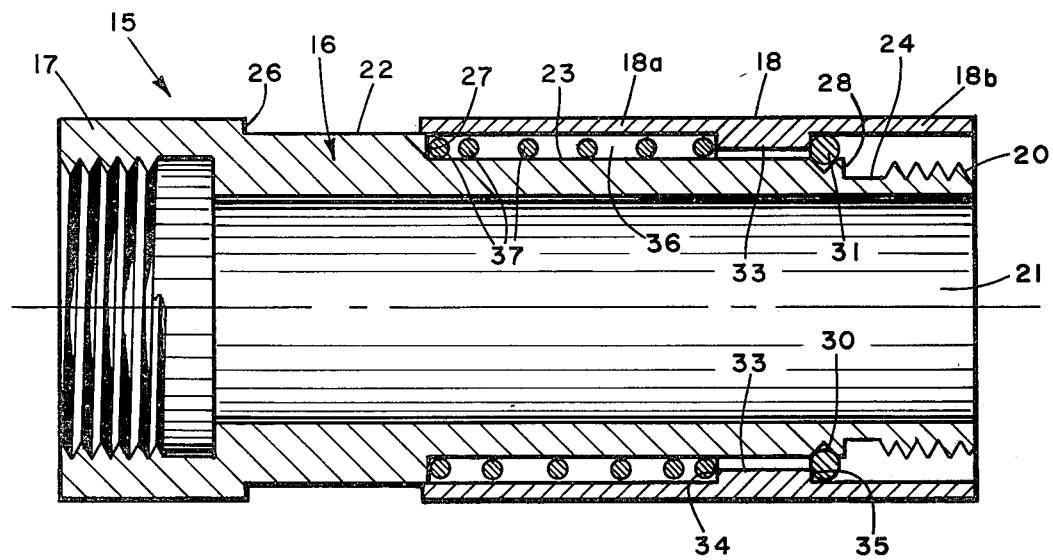
FIG. 2 is a central longitudinal section of the adapter showing the threads in the covered state.

Referring now to the drawings, FIG. 1 shows a nose 10 having a threaded ferrule 11 permanently fastened on the hose end and adapted to be connected to a nozzle 12 having an internally threaded end portion 13. In accordance with this invention, an adapter 15 having a body 16 with an internally threaded portion 17 identical to nozzle portion 13 is threadedly connected to ferrule 11 as a semi-permanent attachment. Adapter 15 has a sleeve 18 coaxially disposed about and adapted to be moved axially over body 16 in the direction of the arrow to expose a threaded end 20, see FIGS. 2 and 3, identical to the threads on ferrule 11, to which nozzle 12 is connectable. Body 16 has a bore 21 with a diameter about the same as that of the hose.

Adapter body 16 is a generally cylindrical member with first, second and third portions 22, 23 and 24, respectively, being successively smaller outside diameters defined by shoulders 26, 27 and 28, respectively. An annular groove 30 is formed in reduced portion 23 closely spaced from shoulder 28 for receiving a split locking ring 31.

Sleeve 18 is generally cylindrical in shape and has an annular radially inwardly projecting ridge 33 located closer to one end than the other and defined by shoulders 34 and 35. The inside diameter of sleeve part 18a on the longer side of ridge 33 is slightly greater than the diameter of the first reduced portion 22 of body 16 so that this part of the sleeve is slidable over the portion 22 of the body. Sleeve part 18a and reduced body portion 23 together with shoulder 27 on the body and shoulder 34 on the sleeve define an annular cavity 36 for a helical compression spring 37 which abuts these shoulders. Ring 31 when secured in groove 30 radially spaces the sleeve from adjacent parts of the body and abuts shoulder 35 of ridge 33 to define the forward (to the right as viewed) limit of sleeve movement. The shorter sleeve part 18b extends protectively over the externally threaded portion 20 of the body when the sleeve is at the forward limit of movement.

Figure 3:
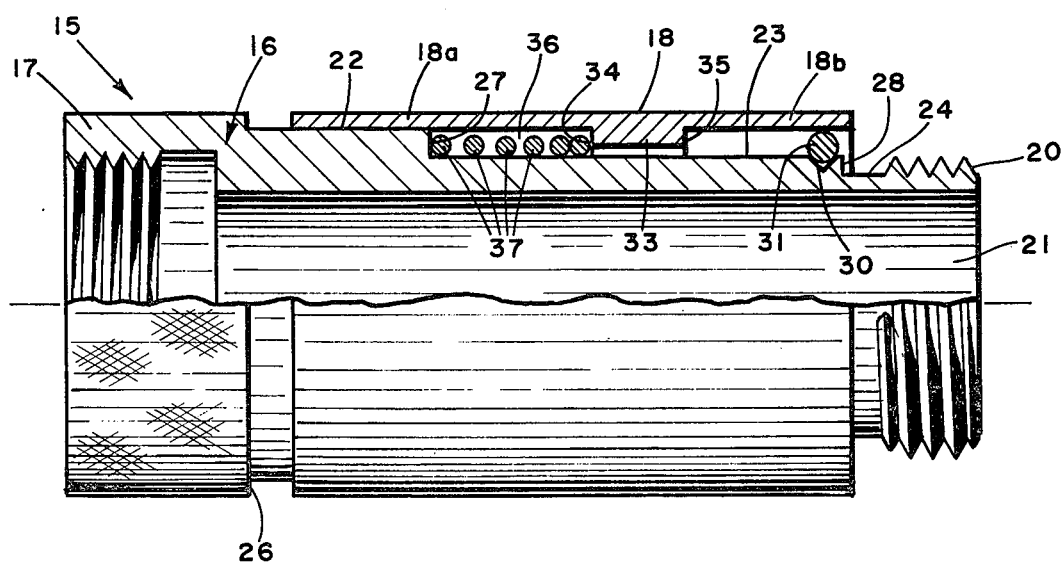
FIG. 3 is a view similar to FIG. 2 partially in section showing the threads in the exposed state.

In operation, end 17 of adapter 15 is threadedly engaged on hose ferrule 11 and remains so connected indefinitely. Sleeve 18 is biased forwardly by spring 37 so that part 18b extends over and protectively encloses male threads 20 of the body. When it is desired to connect a device such as nozzle 12 to the adapter, sleeve 18 is moved axially away from threads 20 to expose them as shown in FIG. 3 and the nozzle is attached in the usual manner. When the nozzle is disconnected, sleeve 18 returns to the protective position shown in FIG. 1.

What is claimed is:

1. A coupling device for connecting the internally threaded end of a nozzle to a hose, comprising a tubular body connectable at one end to the hose and having a smooth cylindrical bore with a diameter about equal to the hose bore diameter extending substantially the full length of the body, said body having external threads at the other end for connection to said nozzel, a sleeve mounted on said body for limited relative axial movement between a first position with one end thereof radially spaced from and fully covering said external threads and a second position fully exposing said threads, said body having first and second axially adjacent external cylindrical portions extending from said external threads for substantially the remainder of the length of the body, said first portion having a diameter approximately the same as the inside diameter of said sleeve and greater than the diameter of said second portion, said first and second portions being joined by radial shoulder means, said sleeve having a radially inwardly projecting ridge defined by axially spaced shoulders and having cylindrical inner surfaces with the same diameter extending from opposite ends of the sleeve to opposite sides of said ridge, said body having an annular groove adjacent to the inner end of said external threads, a snap ring mounted in said groove and projecting radially outwardly therefrom for engagement with one of said shoulders when said sleeve is in said first position, and a helical compression spring coaxially disposed about said second body portion within said sleeve and having opposite ends abutting the other of said sleeve shoulders and said shoulder means, respectively.

2. The coupling device according to claim 1 comprised of no more than four components.

* * * * *